(12) United States Patent
Wang et al.

(10) Patent No.: US 11,416,772 B2
(45) Date of Patent: Aug. 16, 2022

(54) INTEGRATED BOTTOM-UP SEGMENTATION FOR SEMI-SUPERVISED IMAGE SEGMENTATION

(71) Applicant: International Business Machines Corporation, Armonk, NY (US)

(72) Inventors: Hongzhi Wang, Santa Clara, CA (US); Alexandros Karargyris, San Jose, CA (US); Tanveer Fathima Syeda-Mahmood, Cupertino, CA (US); Joy Tzung-yu Wu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 16/700,305

(22) Filed: Dec. 2, 2019

(65) Prior Publication Data

US 2021/0166150 A1     Jun. 3, 2021

(51) Int. Cl.
*G06V 20/20* (2022.01)
*G06N 20/00* (2019.01)
(Continued)

(52) U.S. Cl.
CPC ........... *G06N 20/00* (2019.01); *G06K 9/6256* (2013.01); *G06N 3/08* (2013.01); *G06T 7/10* (2017.01);
(Continued)

(58) Field of Classification Search
CPC ....... G06V 10/774–7753; G06V 20/70; G06V 20/00; G06V 30/274; G06N 20/00;
(Continued)

(56) References Cited

U.S. PATENT DOCUMENTS 8,238,660 B2   8/2012   Lin et al.
8,345,976 B2   1/2013   Wang et al.
(Continued)

FOREIGN PATENT DOCUMENTS

CN    109325534 A    2/2019
WO    2017210690 A1  12/2017

OTHER PUBLICATIONS

WSOD^2: Learning Bottom-up and Top-down Objectness Distillation for Weakly-supervised Object Detection Zhaoyang Zeng, Bei Liu, Jianlong Fu, Hongyang Chao, Lei Zhang, arXiv:1909.04972 Sep. 2019 (Year: 2019).*

(Continued)

*Primary Examiner* — Sean T Motsinger
(74) *Attorney, Agent, or Firm* — Jorge R. Maranto

(57) ABSTRACT

Embodiments of the present disclosure include a computer-implemented method, a system, and a computer program product for integrating bottom-up segmentation techniques into a semi-supervised image segmentation machine learning model. The computer implemented method includes training a machine learning model with a labeled dataset. The labeled dataset includes ground truth segmentation labels for each sample in the labeled dataset. The computer implemented method also includes generating a pseudo labeled dataset by applying an unlabeled dataset to the machine learning model using a top-down segmentation grouping rule. The computer implemented method further includes evaluating the pseudo labeled dataset using a bottom-up segmentation grouping rule to produce evaluation results, combining the pseudo labeled dataset with the second pseudo labeled dataset into a training dataset, and then retraining the machine learning model with the training dataset.

20 Claims, 5 Drawing Sheets

(51) Int. Cl.
    *G06N 3/08*         (2006.01)
    *G06K 9/62*         (2022.01)
    *G06T 7/10*         (2017.01)
    *G06V 30/262*     (2022.01)
    *G06V 20/70*      (2022.01)

(52) U.S. Cl.
    CPC ............ *G06V 20/70* (2022.01); *G06V 30/274* (2022.01); *G06T 2207/20081* (2013.01); *G06T 2207/20084* (2013.01)

(58) Field of Classification Search
    CPC ................ G06N 3/08; G06T 7/10–194; G06T 2207/20081; G06T 2207/20084; G06K 9/00
    See application file for complete search history.

(56) References Cited

U.S. PATENT DOCUMENTS

| | | | |
|---|---|---|---|
| 9,064,306 | B2 | 6/2015 | Beymer et al. |
| 10,430,946 | B1 * | 10/2019 | Zhou ......................... G06T 7/11 |
| 11,176,477 | B2 * | 11/2021 | Gabourie ............. G05D 1/0088 |
| 2017/0076438 | A1 * | 3/2017 | Kottenstette ......... G06V 20/176 |
| 2018/0336683 | A1 | 11/2018 | Feng et al. |
| 2020/0380304 | A1 * | 12/2020 | Sallee ..................... G06T 7/187 |
| 2020/0410388 | A1 * | 12/2020 | Liu ....................... G06K 9/6256 |
| 2021/0117662 | A1 * | 4/2021 | Wang ..................... G06V 40/10 |
| 2021/0142160 | A1 * | 5/2021 | Mohseni .............. G06N 3/0454 |
| 2021/0166150 | A1 * | 6/2021 | Wang ........................ G06N 3/08 |
| 2021/0233247 | A1 * | 7/2021 | Cao .......................... G06N 3/08 |

OTHER PUBLICATIONS

Roy et al., "Combining Bottom-Up, Top-Down, and Smoothness Cues for Weakly Supervised Image Segmentation," 2017 IEEE Conference on Computer Vision and Pattern Recognition, 2017, pp. 7282-7291. DOI: 10.1109/CVPR.2017.770.

Roy et al., "Error Corrective Boosting for Learning Fully Convolutional Networks with Limited Data," arXiv:1705.00938v2, Jul. 2, 2017, 8 pages, Cornell University.

Avants et al., "Symmetric Diffeomorphic Image Registration with Cross-Correlation: Evaluating Automated Labeling of Elderly and Neurodegenerative Brain," MedIA. Feb. 2008, 12(1): 26-41.

Borenstein et al., "Combined Top-Down/Bottom-Up Segmentation," IEEE Transactions on Pattern Analysis and Machine Intelligence, vol. 30, Issue 12, Dec. 2008, pp. 2109-2125. DOI: 10.1109/TPAMI.2007.708840.

Goodfellow et al., "Generative Adversarial Nets," NIPS Proceedings, Advances in Neural Information Processing Systems 27, NIPS 2014, pp. 1-9.

Huo et al., "Spatially Localized Atlas Network Tiles Enables 3D Whole Brain Segmentation from Limited Data," arXiv:1806.00546v2, Jun. 5, 2018, 8 pages, Cornell University.

Leclerc, Y., "Constructing Simple Stable Descriptions for Image Partitioning," Final Submission to IJCV, Apr. 10, 1994, 59 pages. https://pdfs.semanticscholar.org/ebc5/51d6ffc4024aa4afd21356f7babe4443a285.pdf.

Lin et al., "Focal Loss for Dense Object Detection," ICCV, 2017, 99. 2980-2988.

Ronneberger et al., "U-Net: Convolutional Networks for Biomedical Image Segmentation," arXiv:1505.04597v1, May 18, 2015, 8 pages, Cornell Univeristy.

Son et al., "Retinal Vessel Segmentation in Fundoscopic Images with Generative Adversarial Networks," arXiv:1706.09318v1, Jun. 28, 2017, 9 pages, Cornell University.

Wang et al., "Multi-Atlas Segmentation with Joint Label Fusion," IEEE Transactions on Pattern Analysis and Machine Intelligence, 2013, vol. 35, Issue 3, pp. 611-623, IEEE.

Wang et al., ChestX-ray8: Hospital-scale Chest X-ray Database and Benchmarks on Weakly-Supervised Classification and Localization of Common Thorax Diseases, arXiv:1705.02315v5, Dec. 14, 2017, 19 pages, Cornell University.

Zhang et al., "Deep Adversarial Networks for Biomedical Image Segmentation Utilizing Unannotated Images," Medical Image Computing and Computer-Assisted Intervention—MICCAI 2017: 20th International Conference, Proceedings, Part III, pp. 408-416.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

INTEGRATED BOTTOM-UP SEGMENTATION FOR SEMI-SUPERVISED IMAGE SEGMENTATION

BACKGROUND

The present disclosure relates to semantic segmentation and, more specifically, to integrating bottom-up segmentation techniques into a semi-supervised image segmentation system.

Image classification is a process of computer vision that classifies an image according to its visual content. Semantic segmentation is a technique of image classification that predicts labels within an image on a per pixel basis. As opposed to assigning a label to an entire image, labels are assigned to each pixel within the image and each pixel is assigned a label independently from other pixels. Semantic segmentation is often applied to medical images to assist in diagnosis. Modern medical imaging techniques such as Magnetic Resonance Imaging (MRI), Computed Tomography (CT), and retinopathy can generate images and the objects within those images can segmented using various semantic segmentation techniques.

SUMMARY

Embodiments of the present disclosure include a computer-implemented method for integrating bottom-up segmentation techniques into a semi-supervised image segmentation machine learning model. The computer implemented method includes training a machine learning model with a labeled dataset. The labeled dataset includes ground truth segmentation labels for each sample in the labeled dataset. The computer implemented method also includes generating a pseudo labeled dataset by applying an unlabeled dataset to the machine learning model using a top-down segmentation grouping rule. The computer implemented method further evaluates the pseudo labeled dataset produced for the unlabeled dataset using a bottom-up segmentation grouping rule to produce evaluation results, and then the evaluation results are applied to improve the machine learning model such that the model predicted results on unlabeled datasets produce high evaluated scores by the bottom-up segmentation grouping rule.

Additional embodiments are directed to a semi-supervised image segmentation system for integrating bottom-up segmentation techniques into a semi-supervised machine learning model. The image segmentation system is configured to initially train a machine learning model with a labeled dataset. The labeled dataset can be a collection of images including their respective ground truth segmentation. Once trained, the image segmentation system is configured to generate a pseudo labeled dataset by applying an unlabeled dataset to the machine learning model within the system using a top-down semantic segmentation grouping rule. The pseudo labeled dataset is evaluated by a bottom-up semantic segmentation grouping rule. Both the labeled training dataset and unlabeled dataset with pseudo labels can be used to retrain the machine learning model.

Further embodiments are directed to a computer program product for integrating bottom-up segmentation techniques into a semi-supervised image segmentation machine learning model, which can include a computer readable storage medium having program instructions therewith, the program instructions executable by a processor to cause the processor to perform a method. The method includes training a machine learning model with a labeled dataset. The labeled dataset includes ground truth segmentation labels for each sample in the labeled dataset. The method also includes generating a pseudo labeled dataset by applying an unlabeled dataset to the machine learning model using a top-down segmentation grouping rule. The method further evaluates the pseudo labeled dataset produced for the unlabeled dataset using a bottom-up segmentation grouping rule to produce evaluation results, and then the evaluation results are applied to improve the machine learning model such that the model predicted results on unlabeled datasets produce high evaluated scores by the bottom-up segmentation grouping rule.

BRIEF DESCRIPTION OF THE DRAWINGS

These and other features, aspects, and advantages of the embodiments of the disclosure will become better understood with regard to the following description, appended claims, and accompanying drawings where:

Figure 1:
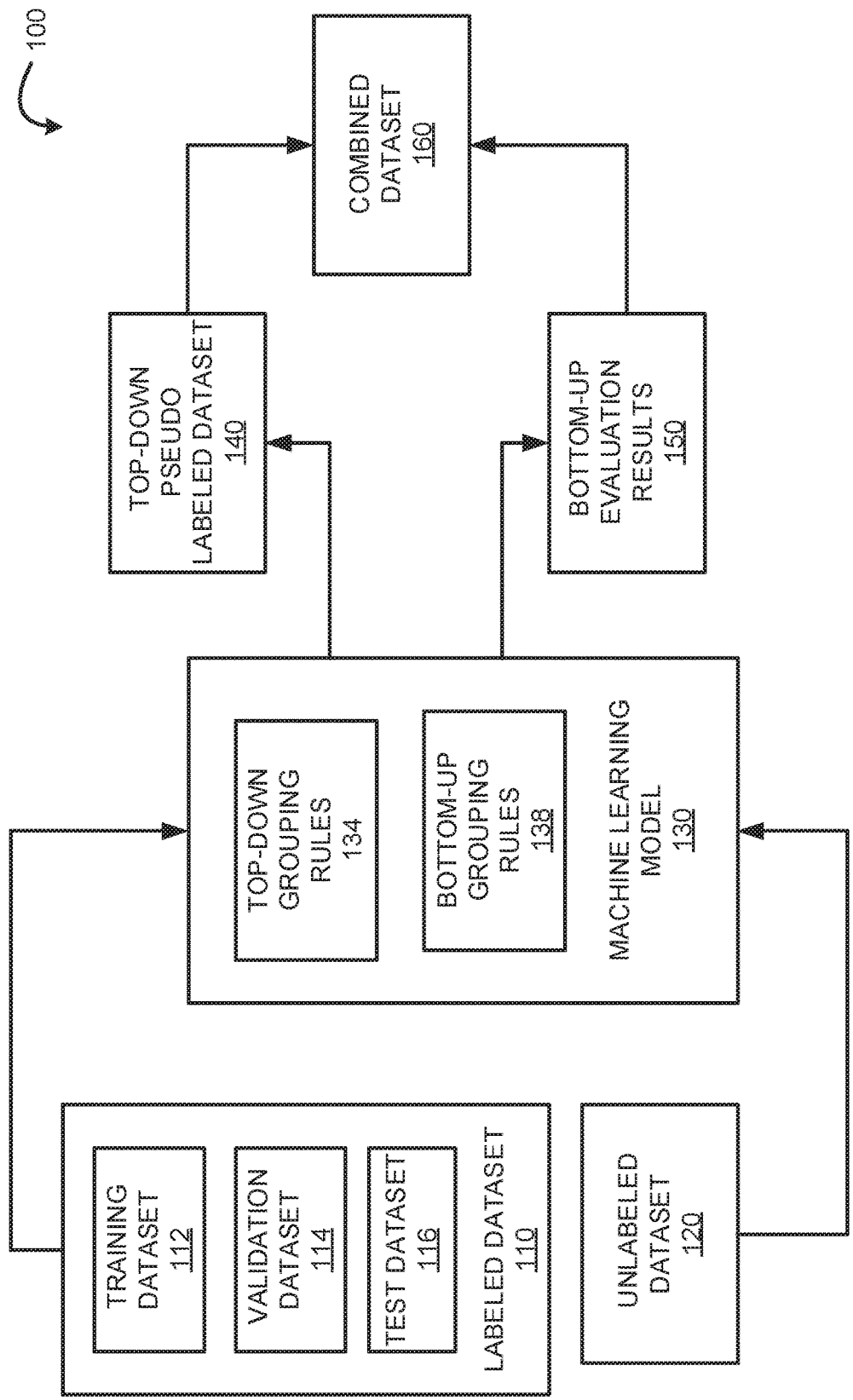
FIG. 1 is a block diagram illustrating an image segmentation system, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to semantic segmentation and, more specifically, to integrating bottom-up segmentation techniques into a semi-supervised image segmentation system. While the present disclosure is not necessarily limited to such application, various aspects of the disclosure may be appreciated through a discussion of various examples using this context.

Image segmentation assists in medical imaging-based analytics by segmenting various regions of an image. For example, an image captured using medical imaging techniques can be analyzed and segmented into regions to detect abnormalities such as tumors, spots from retina scans, abnormal growths, and the like. Semantic image segmentation is a common image segmentation technique that can be used to segment regions in an image. Semantic segmentation involves a technique that predicts labels within an image on a per pixel basis where each pixel within the image is assigned a label.

Semantic segmentation can implement several deep learning-based algorithms and machine learning techniques to solve segmentation tasks. For example, a fully convolutional network (FCN), a SegNet neural network, upsampling, sampling layers by convolution, and skipping connections are some algorithms and machine learning techniques that semantic segmentation can implement when labeling pixels in an image.

Machine learning algorithms are typically trained using techniques such as supervised learning, semi-supervised learning, unsupervised learning, and reinforcement learning. The goal during the training process is to construct a machine learning model that can take an input and produce a desired output. For example, a desired output regarding semantic segmentation would be a label for a pixel that is accurate in identifying and distinguishing objects in an image. Based on the type of learning technique employed, machine learning algorithms can use various forms of data to improve, at least in part, the accuracy of their output. These forms of data can include labeled data, unlabeled data, or a combination of labeled and unlabeled data.

Labeled data requires that data samples (e.g., images) be tagged with meaningful labels that are informative. A labeled sample used in semantic segmentation may have ground truth labels for each pixel that accurately identifies objects in an image. Typically, the annotation of an image is produced by a human capable of accurately segmenting regions within the image. For example, an x-ray scan of a chest may segment the lungs, abdomen, clavicle, and esophagus, into different regions on a per pixel basis. However, generating this type of ground truth labeled data can be time consuming and expensive, especially labeled data involving the identification of objects in a medical image.

To alleviate some of the expense and lack of availability of labeled data, semi-supervised learning incorporates unlabeled data to assist in training a machine learning algorithm. Typical semi-supervised learning techniques include self-training, co-training, tri-training, and tri-training with disagreement. In self-training, an initial model is trained using a labeled dataset. The machine learning algorithm is then used to make predictions on an unlabeled dataset. The samples with the highest prediction probabilities, or confidence, are added to a training set and used to retrain the machine learning algorithm. In co-training, two base machine learning algorithms are initially trained using a labeled dataset. At every iteration, each machine learning algorithm selects a sample dataset of the most confidently predicted unlabeled samples. These sample datasets are added to a training set of the other machine learning algorithm and are used to train each other.

Commonly, self-labeling algorithms, such as the algorithms used in semi-supervised learning techniques, provide inaccurate labels during the iterative process. Inaccuracy during the training process can lead to an increase in noise for a machine learning model. Noise can be anything spurious or extraneous to the original data, that is not intended to be present, but was introduced due to a faulty training process.

Limitations on efficiency remain in semi-supervised learning techniques. For example, semi-supervised learning techniques such as an adversarial learning framework require a discriminator network that relies on labeled data to learn a reliable model for segmentation assessment. For applications with limited labeled data, which is a common scenario when applying semi-supervised models, training a reliable discriminator network can be difficult when applying an adversarial learning framework. Furthermore, since a segmentation model and a discriminator model are both required to be trained, more computational resources are needed to train a functional adversarial model.

Embodiments of the present disclosure may overcome the above, and other problems, by integrating bottom-up segmentation techniques into a semi-supervised image segmentation system. The image segmentation system is configured to initially train a machine learning model with a labeled dataset. The labeled dataset can be a collection of images including their respective ground truth segmentation. Once trained, the image segmentation system is configured to generate a pseudo labeled dataset by applying an unlabeled dataset to the machine learning model within the system using a top-down semantic segmentation grouping rule. The pseudo labeled dataset is evaluated by bottom-up grouping rules and the evaluation results are applied for retraining the machine learning model.

More specifically, the image segmentation system described herein uses semi-supervised learning techniques to train a machine learning model by integrating bottom-up semantic segmentation grouping rules and top-down semantic segmentation grouping rules into the training cycle. In other words, labels generated for the unlabeled dataset using top-down grouping rules and are evaluated by bottom-up grouping rules to train the machine learning model using a semi-supervised learning approach. By combining top-down grouping rules and bottom-up grouping rules into a training cycle of a machine learning model, the image segmentation system described herein improves the efficiency and accuracy of a semantic segmentation model because it does not require additional labeled data nor does it require additional computational resources, such as what is needed in an adversarial learning framework.

In some embodiments, the machine learning model is a convolutional neural network. A convolutional neural network is a type of deep neural network that can be applied to analyzing images. A convolutional neural network can adapt to the properties of an image where pixel position and neighborhood have semantic meaning and elements of interest can appear anywhere within an image. Embodiments of the present disclosure can incorporate various types of convolutional neural networks such as LeNet, U-Net, AlexNet, VGGNet 16, Inception, ResNets, and the like.

Embodiments of the present disclosure include a U-Net convolutional neural network used as the machine learning model. The architecture of the U-Net convolutional neural network can include a contracting path and an expanding path. The contracting path being five levels deep with 2×2 pooling between each level. The expanding path being connected by an up sampling filter with a 2×2 kernel. The convolutions can have a kernel size of 3×3, a stride equivalent to one, a pad equivalent to one, and followed by rectified linear units. Each level can be composed of two convolutions back to back. The last layer containing a 1×1 convolution followed by a softmax function, which can give the probabilities of the segmentation labels.

In some embodiments, the image segmentation system duplicates the labeled dataset. Typically, there is substantially more unlabeled data than labeled data. When implementing semi-supervised learning methods, training can be biased by the unsupervised learning component even when weighted. To overcome the bias, the labeled data can be uniformly duplicated such that after duplication the amount of labeled training data is equivalent or comparable to the number of unlabeled training data.

FIG. 1 is a block diagram illustrating an image segmentation system 100, in accordance with embodiments of the present disclosure. The image segmentation system 100 includes a labeled dataset 110, an unlabeled dataset 120, a machine learning model 130, a top-down pseudo labeled dataset 140, a bottom-up evaluation results 150, and a combined dataset 160. The labeled dataset 110 includes a training dataset 112, a validation dataset 114, and a test dataset 116.

The labeled dataset 110 is a set of data used by the image segmentation system 100 to initially train the machine learning model 130. The labeled dataset 110 includes a group of data samples, or samples, that have been tagged with one or more ground truth segmentation labels. A label can typically include one or more meaningful tags that are informative regarding the sample. For example, labels may indicate that an image (i.e., a sample) contains a vehicle, on a roadway, and next to a stop sign. Ground truth refers to labels applied in an annotation process that is conducted by an individual directly observing the sample. For example, annotating a chest x-ray can be performed by a medical professional capable of properly labeling areas such as a rib cage, trachea, clavicle, lungs, and sub diaphragmatic area.

For a semantic segmentation analysis to be performed, each pixel in an image is assigned a label. For example, if an image contains a person, a vehicle, furniture, trees, and a roadway, then each pixel will be assigned to one of those labels included in the image.

In some embodiments, the labeled dataset 110 is divided into a training dataset 112, a validation dataset 114, and a test dataset 116. The labeled dataset 1110 can be randomly divided into three equal size groups to form the dataset. The training dataset 112 can be used to initially train the machine learning model 130 to label images. The validation dataset 114 can be used during a process used, as part of training, to evaluate the quality of the output from the machine learning model 130. Validation can ensure that the performance of the model generalizes beyond the training dataset 112. The test dataset 116 can be used during a process of testing the machine learning model 130 after the machine learning model 130 has been initially vetted by the validation dataset 114.

In some embodiments, the labeled dataset 110 divides into the training dataset 112, the validation dataset 114, and the test dataset 116 using cross-validation. Cross-validation splits the labeled dataset 110 into a moving test where each dataset is changed for each iteration. For example, using K-Fold cross-validation, the datasets change for each iteration k times. By conducting cross-validation, the accuracy of the machine learning model 130 can be assessed using different sampling splits, and the training process can be performed on larger datasets (e.g., (k−1)*N samples). Different cross-validation techniques such as stratified K-Fold, Leave-one-out (LOO), and Leave-P-out (LPO) can also be used.

The unlabeled dataset 120 is a set of data used by the image segmentation system 100 to apply to the machine learning model 130 to predict the top-down pseudo labeled dataset 140 and the bottom-up evaluation results 150. The unlabeled dataset 120 includes a group of samples that have not been tagged with any labels. For example, an unlabeled dataset 120 may include photographs, video recordings, audio recordings, or any other type of untagged data. The unlabeled dataset 120 can be applied to trained models to find and label structures within this data.

The machine learning model 130 is a component of the image segmentation system 100 configured to output segmented labels on an image, in accordance with embodiments of the present disclosure. The machine learning model 130 can employ various machine learning techniques to determine the segments of an image. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the machine learning model 130 is a convolutional neural network. Convolutional neural networks are a type of deep neural network used to analyze images. A convolutional neural network can adapt to the properties of an image where pixel position and neighborhood have semantic meaning and elements of interest can appear anywhere within an image. Embodiments of the present disclosure can incorporate various types of convolutional neural networks such as LeNet, U-Net, AlexNet, VGGNet 16, Inception, ResNets, and the like.

In some embodiments, the machine learning model 130 applies the top-down grouping rules 134 to output the top-down pseudo labeled dataset 140. The top-down grouping rules 134 use object representation learned from the labeled dataset 110 to detect an object in a given input image and provide an approximation of the segmentation for that object.

In some embodiments, a weighted cross entropy function is used a top-down grouping rule within the top-down grouping rules 134. A weighted cross entropy function can define a loss function in the machine learning model 130 whose output is a probability value between 0 and 1. The absolute probability can be considered as the ground truth label. Cross-entropy loss increases as the predicted probability diverges from the ground truth label. For example, a predicted probability of 0.067 when the ground truth label is 1 would indicate a poor result with a high loss value. In some embodiments, a weighted cross entropy function applied to supervised labels is defined according to Equation 1:

$$L_{sup}(M_\theta(I), S) = \sum_{l=1}^{K} \sum_{x \in r(S,l)} -\alpha_l \log(p_l(x \mid I, \theta)) \quad \text{Equation 1}$$

where $L_{sup}$ represents the standard term on labeled training data, capturing how well the model predicted results agree with the ground truth labels. Let θ be the parameters of a convolutional neural network, let $M_\theta(I)$ be the result produced by the model for image I, and let S be the ground truth segmentation.

In some embodiments, the machine learning model 130 applies the bottom-up grouping rules 138 to evaluate the pseudo labeled dataset 140. The bottom-up grouping rules 138 define coherent groups of pixels that are likely to belong together to either the object or the background.

In some embodiments, the minimum description length principle is used as a bottom-up grouping rule within the bottom-up grouping rules 138. The minimum description length principle stems from the information theory by interpreting segmentation as a representation for efficient data storage. Using this principle, a segmentation should partition an image into regions with homogenous image properties such that encoding the image using the partition results in maximum compression. For example, given an image I, the overall encoding cost for the image using a segmentation produced by the machine learning model 130 as a convolutional neural network represented as $M_\theta(I)$ can be defined according to Equation 2:

$$L_{unsup}(M_\theta(I),I) = L(I|M_\theta(I)) + L(M_\theta(I)) \quad \text{Equation 2}$$

where $L_{unsup}$ applies to unlabeled data within the unlabeled dataset 120, capturing how well the model predicted segmentation agrees with the image under bottom-up segmentation rules. In some embodiments, L(S) represents the encoding cost for segmentation S. The encoding cost can control the complexity of the segmentation. When prior knowledge about the segmentation is available (e.g., size, shape, and spatial relation between segments), it can be included in L(S) as a factor in the desired segmentation. In some embodiments, no prior knowledge is known about the segmentation and all valid labels have equal encoding costs. In some embodiments, $L(I|M_\theta(I))$ represents the encoding cost for image I using segmentation produced by the machine learning model 130 where the measured entropy is defined according to Equation 3:

$$L(I \mid M_\theta(I)) = \sum_{l=1}^{K} \sum_{x \in r(M_\theta(I),l)} -\log[p(I(x) \mid I, \theta, l)] \quad \text{Equation 3}$$

where p is defined as the intensity distribution for pixels assigned to label l in $M_\theta(I)$. In some embodiments, the intensity distribution can be calculated through soft label assignment as defined according to Equation 4:

$$p(c \mid I, \theta, l) = \frac{\sum_{x \in \{l(x)=c\}} p_l(x \mid I, \theta)}{\sum_{x \in I} p_l(x \mid I, \theta)} \quad \text{Equation 4}$$

In some embodiments, the minimum description length principle is used as a bottom-up grouping rule within the bottom-up grouping rules 138 and divides the semantic labels in the labeled dataset 110. Semantic labels can contain regions with different intensity profiles. For example, a background label typically combines image regions that are not considered as an object of interest. It can include structures with different appearance profiles.

To improve the minimum description length principle when assessing segmentations with heterogenous segments, each semantic label is divided into multiple sub-labels such that each distinct homogenous region can be covered by a distinct label. For example, let $\{l^1, l^2, \ldots, l^m\}$ represent a label set with $n_l$ sublabels for label l. The label set can be directly applied to Equation 2 on unlabeled images. To apply the label set for labeled images using Equation 1, a model prediction for the original labels is required. The model prediction for the original labels is defined according to Equation 5:

$$p_l(x \mid I, \theta) = \sum_{i=1}^{n_l} p_{li}(x \mid I, \theta) \quad \text{Equation 5}$$

To determine $n_l$ for a semantic label, prior knowledge can be applied. However, if prior knowledge is not available, a relatively large number can be chosen. If the number of sub-labels is larger than necessary, some of the sub-labels may not have any pixels assigned to them by the algorithm.

The top down pseudo labeled dataset 140 is a set of data of the image segmentation system 100 produced by the machine learning model 130. The top down pseudo labeled dataset 140 includes samples produced by the machine learning model 130 which agree with a selected top down grouping rule within the top down grouping rules 134. In some embodiments, the top down pseudo labeled dataset 140 includes samples applied with a weighted cross entropy function used as the top down grouping rule.

The combined dataset 160 is a combination of the top-down pseudo labeled dataset 140 and the bottom-up evaluation results 150 combined for retraining the image segmentation system 100. In some embodiments, the combined dataset 160 is a result of the machine learning model 130 being a convolutional neural network defined according to Equation 6:

$$L(\theta) = \sum_{i=1}^{n} L_{sup}(M_\theta(I_i), S_i) + \lambda \sum_{j=i}^{m} L_{unsup}(M_\theta(I_j), I_j) \quad \text{Equation 6}$$

Let L(θ) represent the combined dataset 160 with θ being the parameters of the convolutional neural network. Let $M_\theta(I)$ be the result produced by the machine learning model 130 for image I. Let $S_i$ represent the ground truth segmentation. Where $\Sigma_{i=1}^{n} L_{sup}(M_\theta(I_i), S_i)$ represents the samples which agree with a top-down segmentation grouping rules and $\lambda \Sigma_{j=i}^{m} L_{unsup}(M_\theta(I_j),I_j)$ represents the samples which agree with a bottom-up segmentation grouping rule. Let λ represent a predetermined weight for the unsupervised labels.

The bottom-up evaluation results 150 is a set of data of the image segmentation system 100 produced by the machine learning model 130. The bottom-up grouping rules are applied to evaluate the pseudo labeled dataset 140 by assessing how well samples produced by the machine learning model 130 agree with a selected bottom-up grouping rules within the bottom-up grouping rules 138. In some embodiments, the bottom-up evaluation results 150 includes samples applied with a minimum description length principle used as the bottom-up grouping rules. For example, the samples can be derived using Equation 2.

Figure 2:
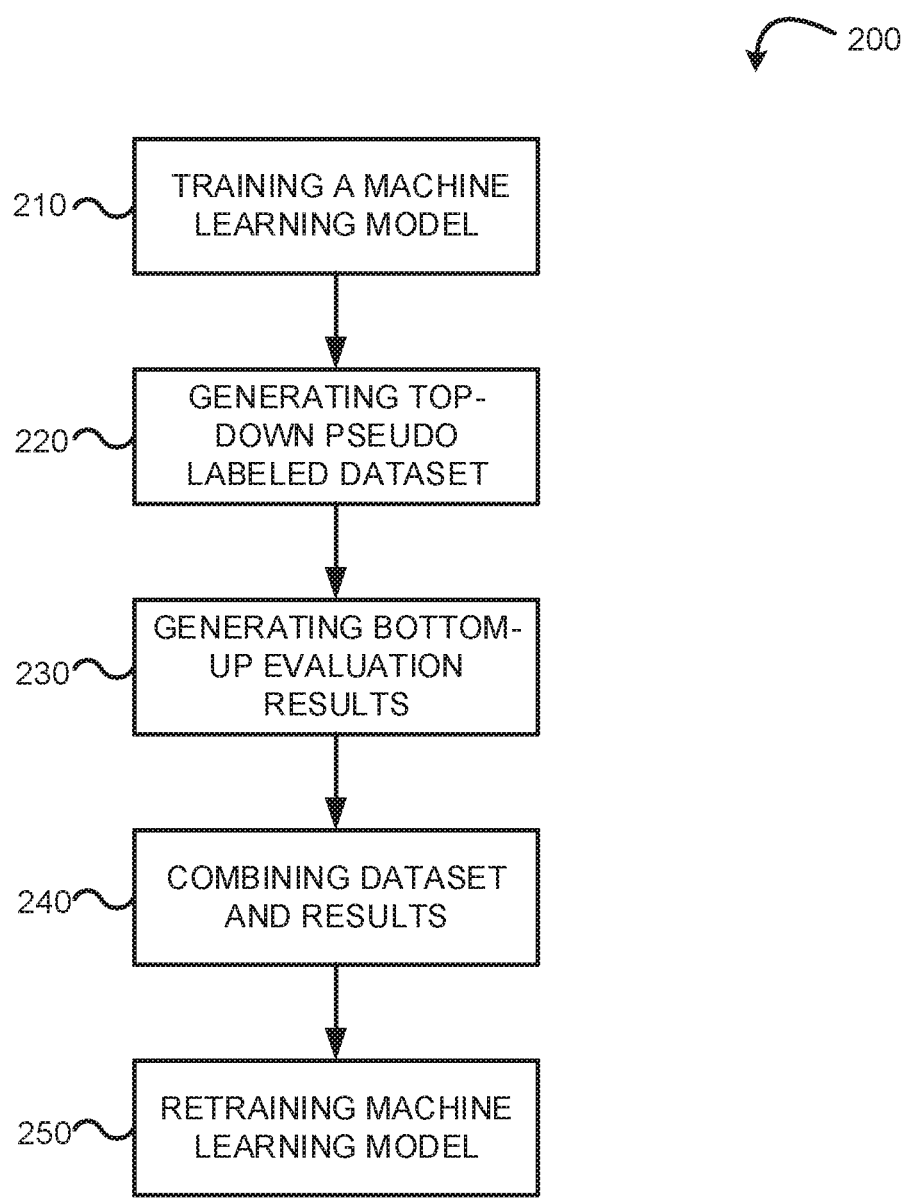
FIG. 2 is a flow chart of a machine learning training process, in accordance with embodiments of the present disclosure.

FIG. 2 is a flow diagram illustrating a process 200 for integrating bottom-up segmentation into a semi-supervised machine learning model, in accordance with embodiments of the present disclosure. The process 200 may be performed by hardware, firmware, software executing on a processor, or a combination thereof. For example, any or all of the steps of the process 200 may be performed by one or more processors embedded in computer system 300 (FIG. 3) or performed by a cloud computing environment 400 (FIG. 4).

The image segmentation system 100 trains the machine learning model 130 with the labeled dataset 110. This is illustrated at step 210. The machine learning model 130 can be initially trained with the labeled dataset 110 in a supervised learning approach. The machine learning model 130 can employ a machine learning algorithm to analyze the labeled dataset 110 and produce an inferred function, which the machine learning model 130 can use to map labels to unlabeled samples. The algorithm and technique used by the machine learning model 130 can be selected to minimize bias, variance, function complexity, dimensionality of the input space, and noise. Other factors such as heterogeneity of the labeled dataset 110, redundancy of the labeled dataset 110, and presence of interactions and non-linearities can be used to determine which algorithm to use when training the machine learning model 130. Once a machine learning algorithm is selected, the machine learning model 130 is trained to perform semantic segmentation on an image.

In some embodiments, the labeled dataset 110 is split into a training dataset 112, a validation dataset 114, and a test dataset 116. The training dataset 112 can then be used to initially train the machine learning model 130. The validation dataset 114 can be used to initially vet the machine learning model 130. The test dataset 116 can be used to test the machine learning model 130 after training has been performed. Testing can occur through various methods such as holdout and cross-validation. The holdout method includes testing the machine learning model 130 where the test dataset 116 is separate and apart from the training dataset 112. The cross-validation method involves partitioning the labeled dataset 110 into the training dataset 112 and validation dataset 114.

In some embodiments, testing is performed using the cross-validation method using a k-fold cross validation technique. For example, a five-fold cross validation test involves having the labeled dataset 110 being partitioned into five parts of approximately equal size. The machine learning model 130 can then be trained with four of the partitions and tested with the fifth partition. This can be repeated for each of the partitions where each partition is rotated to become the test dataset 116. Once trained, an estimation of accuracy is averaged over the five training sessions to get a total effectiveness of the machine learning model 130.

A top-down pseudo labeled dataset 140 is generated by the machine learning model 130. This is illustrated at step 220. A top-down semantic segmentation grouping rule can be selected from the top-down grouping rules 134 to capture how well the machine learning model 130 predicted segmentation agrees with the image under the selected top-down semantic segmentation grouping rule. Once selected, the machine learning model 130 can be used to generate the top-down pseudo labeled dataset 140 that includes samples which agree with the selected top-down grouping rule.

A bottom-up evaluation results 150 are generated by the machine learning model 130. This is illustrated at step 230. A bottom-up segmentation grouping rule can be selected from the bottom-up grouping rules 138 to capture how well the machine learning model 1340 predicted segmentation agrees with the image under the selected bottom-up semantic segmentation grouping rule. Once selected, the machine learning model 130 can be used to generate the bottom-up evaluation results 150 which includes samples which agree with the selected bottom-up grouping rule.

The top-down pseudo labeled dataset 140 and the bottom-up evaluation results 150 are combined into the combined dataset 160. This is illustrated at step 240. The combined dataset 160 includes samples that agree with top-down grouping rules 134 and samples that agree with bottom-up grouping rules 138.

Once combined, the combined dataset 160 is used to retrain the machine learning model 130. This is illustrated at step 250. The retraining process can be used to improve the predicted probability of the segmentation performed by the machine learning model 130. As a result, the process 200 produces a semi-supervised method for semantic image segmentation that integrates prior knowledge developed in bottom-up unsupervised segmentation with top-down supervised segmentation. The process 200 trains the machine learning model 130 with unlabeled images by evaluating how well the machine learning model 130 performs on unlabeled images and applies the evaluation results to improve training.

Figure 3:
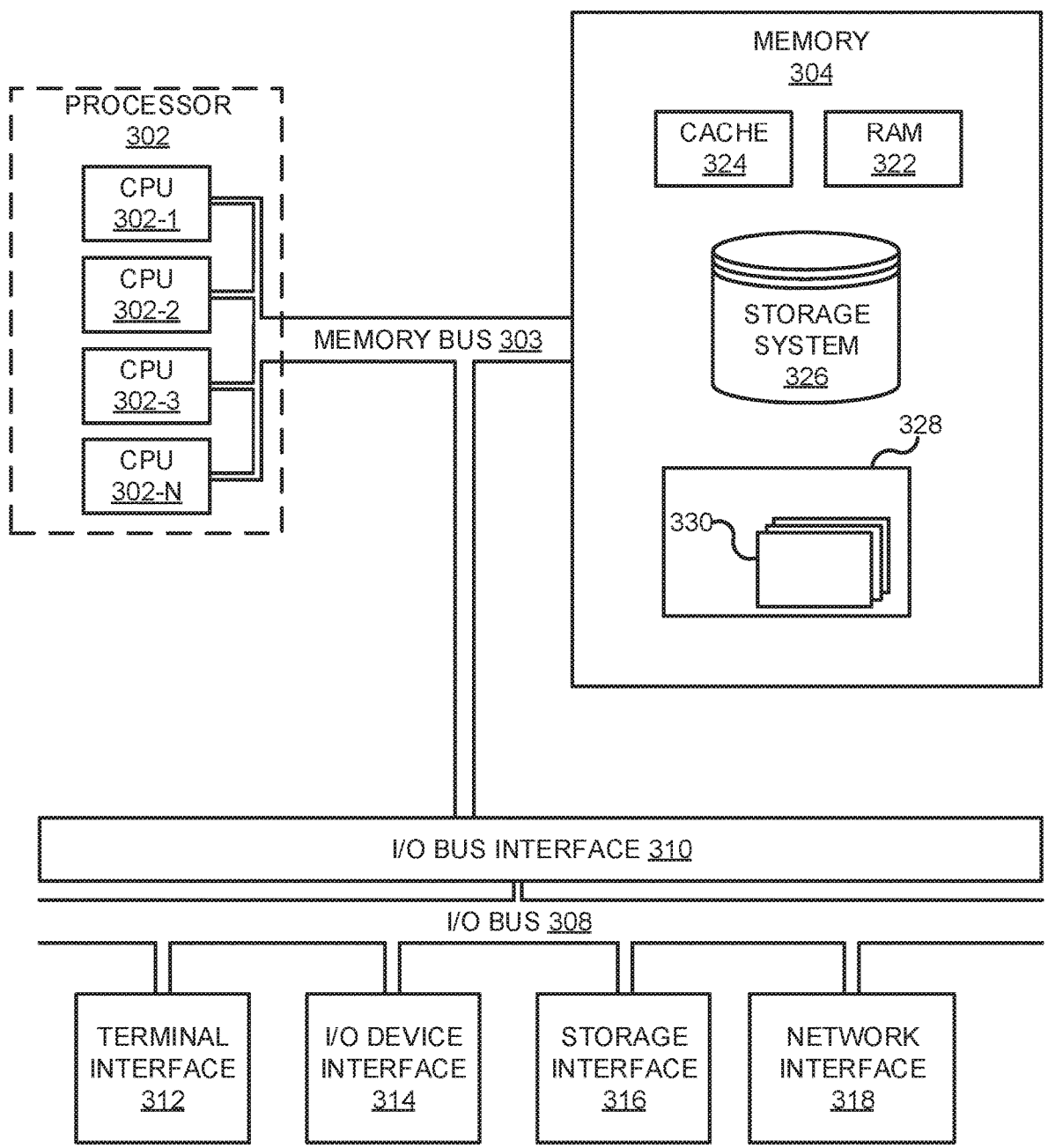
FIG. 3 is a high-level block diagram illustrating an example computer system that may be used in implementing one or more of the methods, tools, and modules, and any related functions, described herein, in accordance with embodiments of the present disclosure.
Figure 4:
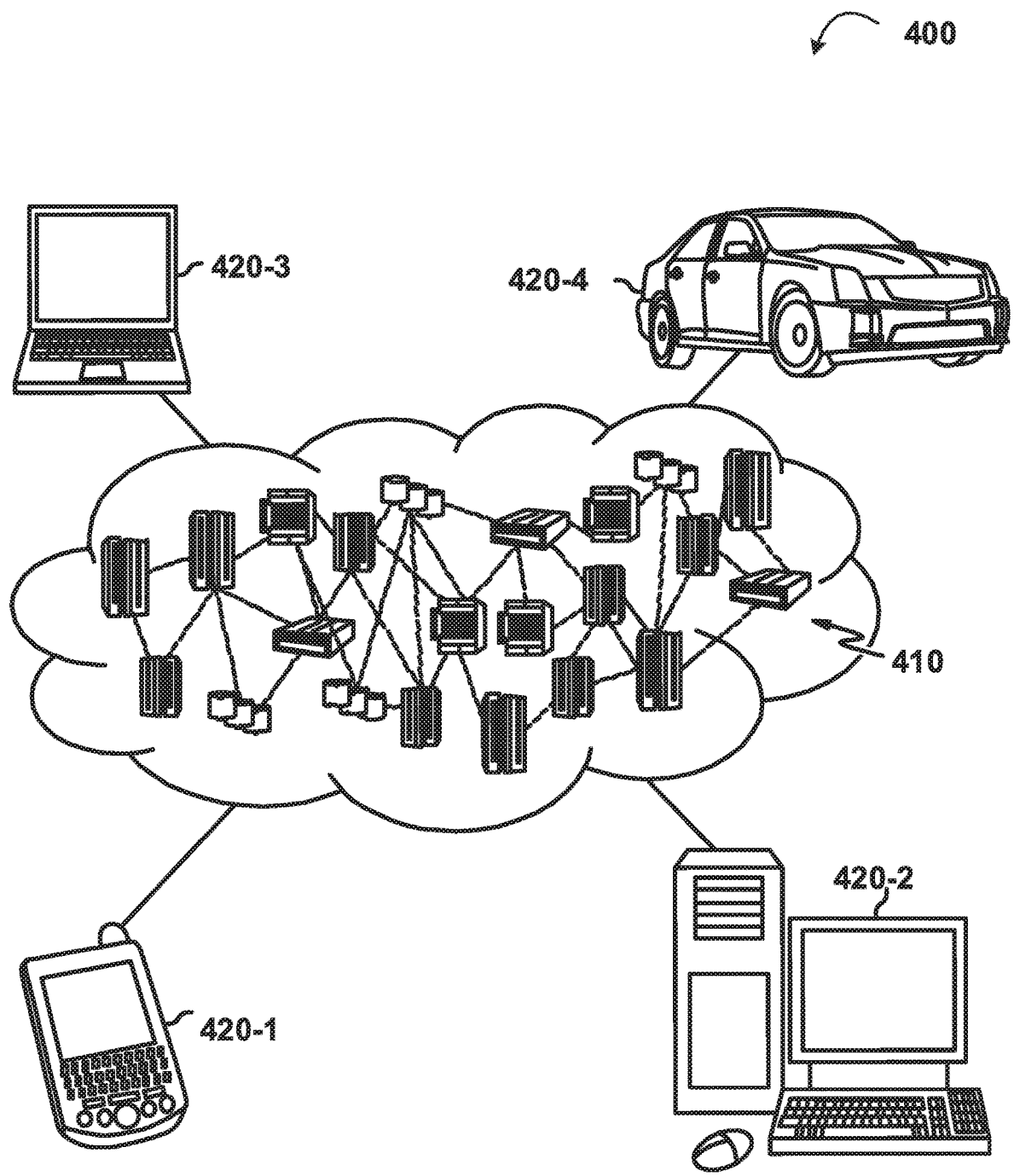
FIG. 4 depicts a cloud computing environment, in accordance with embodiments of the present disclosure.

Referring now to FIG. 3, shown is a high-level block diagram of an example computer system 300 (e.g., the image segmentation system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 300 may comprise one or more processors 302, a memory 304, a terminal interface 312, a I/O (Input/Output) device interface 314, a storage interface 316, and a network interface 318, all of which may be communicatively coupled, directly or indirectly, for inter-component communication via a memory bus 303, a I/O bus 308, and an I/O bus interface 310.

The computer system 300 may contain one or more general-purpose programmable central processing units (CPUs) 302-1, 302-2, 302-3, and 302-N, herein generically referred to as the processor 302. In some embodiments, the computer system 300 may contain multiple processors typical of a relatively large system; however, in other embodiments the computer system 300 may alternatively be a single CPU system. Each processor 301 may execute instructions stored in the memory 304 and may include one or more levels of on-board cache.

The memory 304 may include computer system readable media in the form of volatile memory, such as random-access memory (RAM) 322 or cache memory 324. Computer system 300 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the processors 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units, multiple I/O buses, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 300 may be a multi-user mainframe computer system, a single-user system, or a server computer or similar device that has little or no direct user interface, but receives requests from other computer systems (clients). Further, in some embodiments, the computer system 300 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1 to 420-4 shown in FIG. 4 are intended to be illustrative only and that computing nodes 10 and cloud computing environment 400 can communicate with any type of computerized device over any type of network and/or network addressable connection (e.g., using a web browser).

Figure 5:
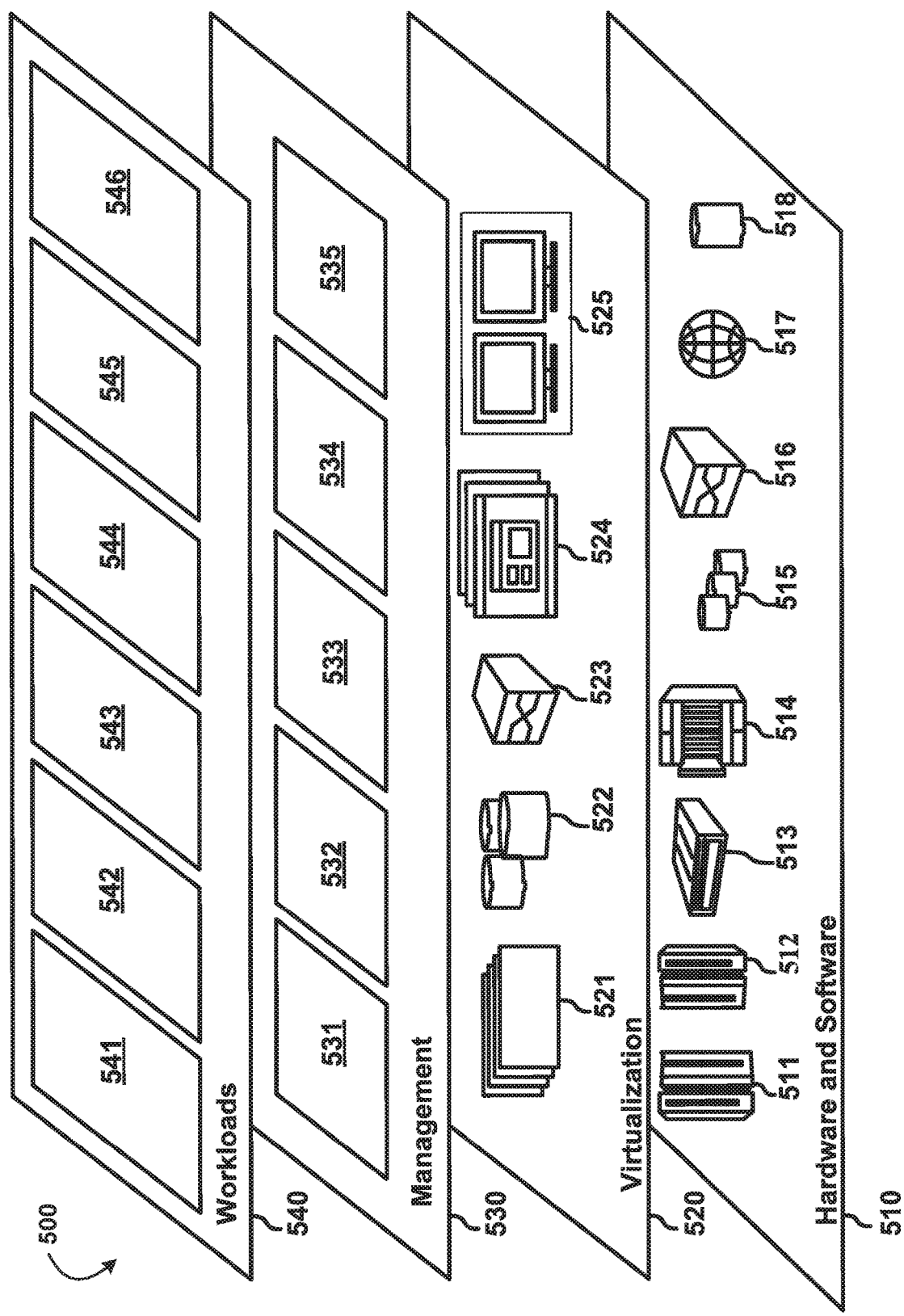
FIG. 5 depicts abstraction model layers, in accordance with embodiments of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include: mapping and navigation 541; software development and lifecycle management 542; virtual classroom education delivery 543; data analytics processing 544; transaction processing 545; and semi-supervised machine learning 546 (e.g., the image segmentation system 100).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for integrating bottom-up segmentation into a semi-supervised machine learning model, the method comprising:
    training a machine learning model with a labeled dataset, wherein the labeled dataset includes ground truth segmentation labels for each sample in the labeled dataset;
    generating a pseudo labeled dataset by applying an unlabeled dataset to the machine learning model using a top-down segmentation grouping rule;
    evaluating the pseudo labeled dataset by applying a bottom-up segmentation grouping rule to produce evaluation results relating to a quality of the pseudo labeled dataset;
    combining the pseudo labeled dataset with the evaluation results into a training dataset; and
    retraining the machine learning model with the training dataset.

2. The computer-implemented method of claim 1, wherein the machine learning model is a convolutional neural network.

3. The computer-implemented method of claim 1, further comprising:
    duplicating the labeled dataset uniformly to be equivalent in size with the unlabeled dataset prior to the machine learning model being trained with the labeled dataset.

4. The computer-implemented method of claim 1, wherein the bottom-up segmentation grouping rule is a minimum description length principle.

5. The computer-implemented method of claim 4, wherein the minimum description length principle includes a size, a shape, and a spatial relation between segments as factors.

6. The computer-implemented method of claim 4, wherein the minimum description length principle divides a label into sub-labels, wherein each sub-label of the sub-label represents a distinct homogenous region.

7. The computer-implemented method of claim 1, wherein the top-down segmentation grouping rule is a weighted cross entropy function.

8. The computer-implemented method of claim 1, wherein the evaluation results are weighted.

9. A system comprising:
 a memory storing program instructions; and
 a processor, wherein the processor is configured to execute the program instructions to perform a method comprising:
  training a machine learning model with a labeled dataset, wherein the labeled dataset includes ground truth segmentation labels;
  generating a pseudo labeled dataset by applying an unlabeled dataset to the machine learning model using a top-down segmentation grouping rule;
  evaluating the pseudo labeled dataset by applying a bottom-up segmentation grouping rule to produce evaluation results relating to a quality of the pseudo labeled dataset;
  combining the pseudo labeled dataset with the evaluation results into a training dataset; and
  retraining the machine learning model with the training dataset.

10. The system of claim 9, wherein the machine learning model is a convolutional neural network.

11. The system of claim 9, further comprising:
 duplicating the labeled dataset uniformly to be equivalent in size with the unlabeled dataset prior to the machine learning model being trained with the labeled dataset.

12. The system of claim 9, wherein the bottom-up segmentation grouping rule is a minimum description length principle.

13. The system of claim 12, wherein the minimum description length principle includes a size, a shape, and a spatial relation between segments as factors.

14. The system of claim 12, wherein the minimum description length principle divides a label into sub-labels, wherein each sub-label of the sub-label represents a distinct homogenous region.

15. The system of claim 9, wherein the top-down segmentation grouping rule is a weighted cross entropy function.

16. The system of claim 9, wherein the evaluation results are weighted.

17. A computer program product comprising a computer readable storage medium having program instructions embodied therewith, the program instructions executable by a processor to cause the processor to perform a method comprising:
 training a machine learning model with a labeled dataset, wherein the labeled dataset includes ground truth segmentation labels;
 generating a pseudo labeled dataset by applying an unlabeled dataset to the machine learning model using a top-down segmentation grouping rule;
 evaluating the pseudo labeled dataset by applying a bottom-up segmentation grouping rule to produce evaluation results relating to a quality of the pseudo labeled dataset;
 combining the pseudo labeled dataset with the evaluation results into a training dataset; and
 retraining the machine learning model with the training dataset.

18. The computer program product of claim 17, wherein the machine learning model is a convolutional neural network.

19. The computer program product of claim 17, further comprising:
 duplicating the labeled dataset uniformly to be equivalent in size with the unlabeled dataset prior to the machine learning model being trained with the labeled dataset.

20. The computer program product of claim 17, wherein the bottom-up segmentation grouping rule is a minimum description length principle.

* * * * *